July 29, 1958 A. D. OKONSKI 2,845,052
INTERNAL COMBUSTION ENGINE
Filed Dec. 5, 1956 3 Sheets-Sheet 2
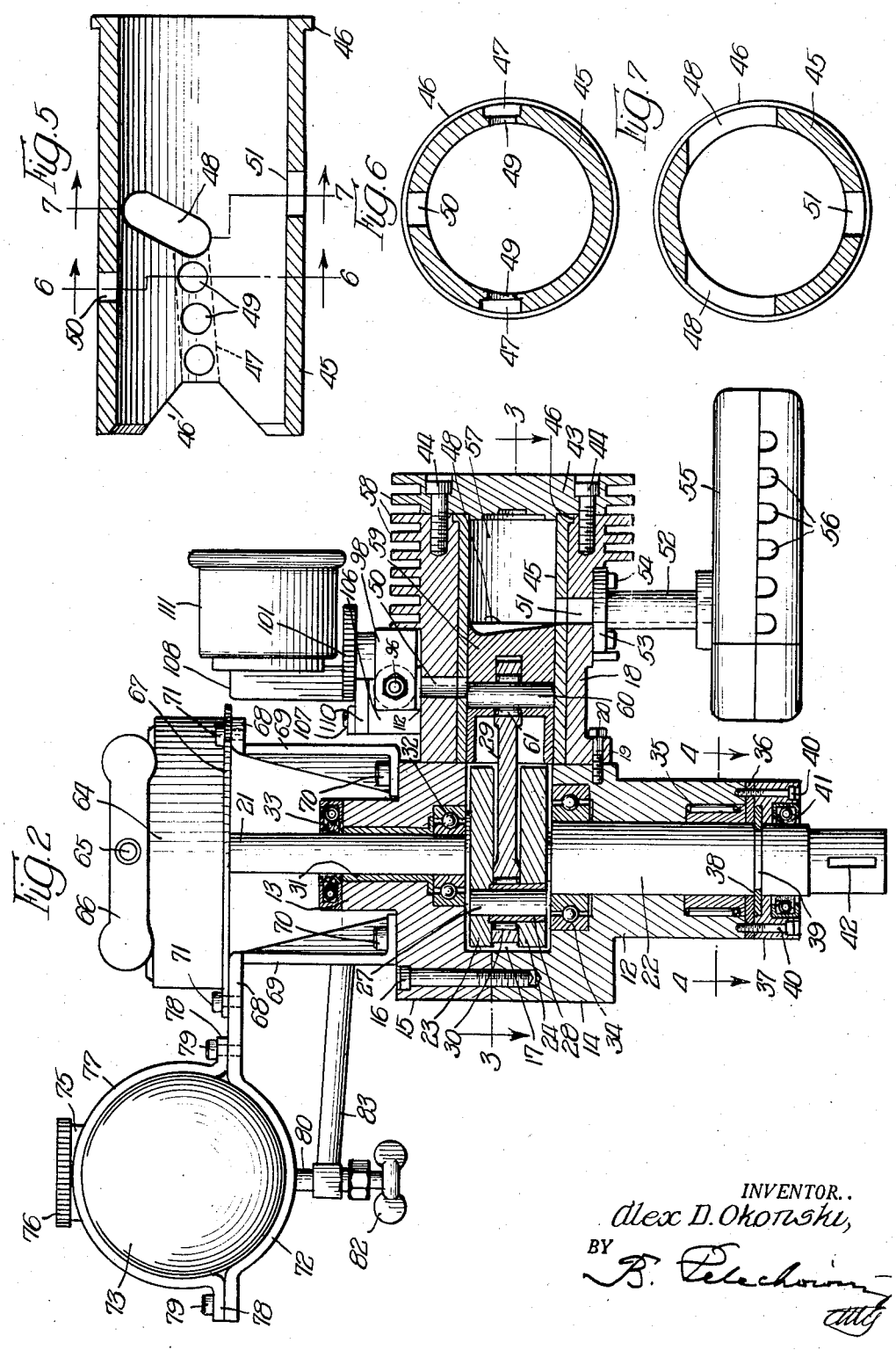
INVENTOR..
Alex D. Okonski,
BY

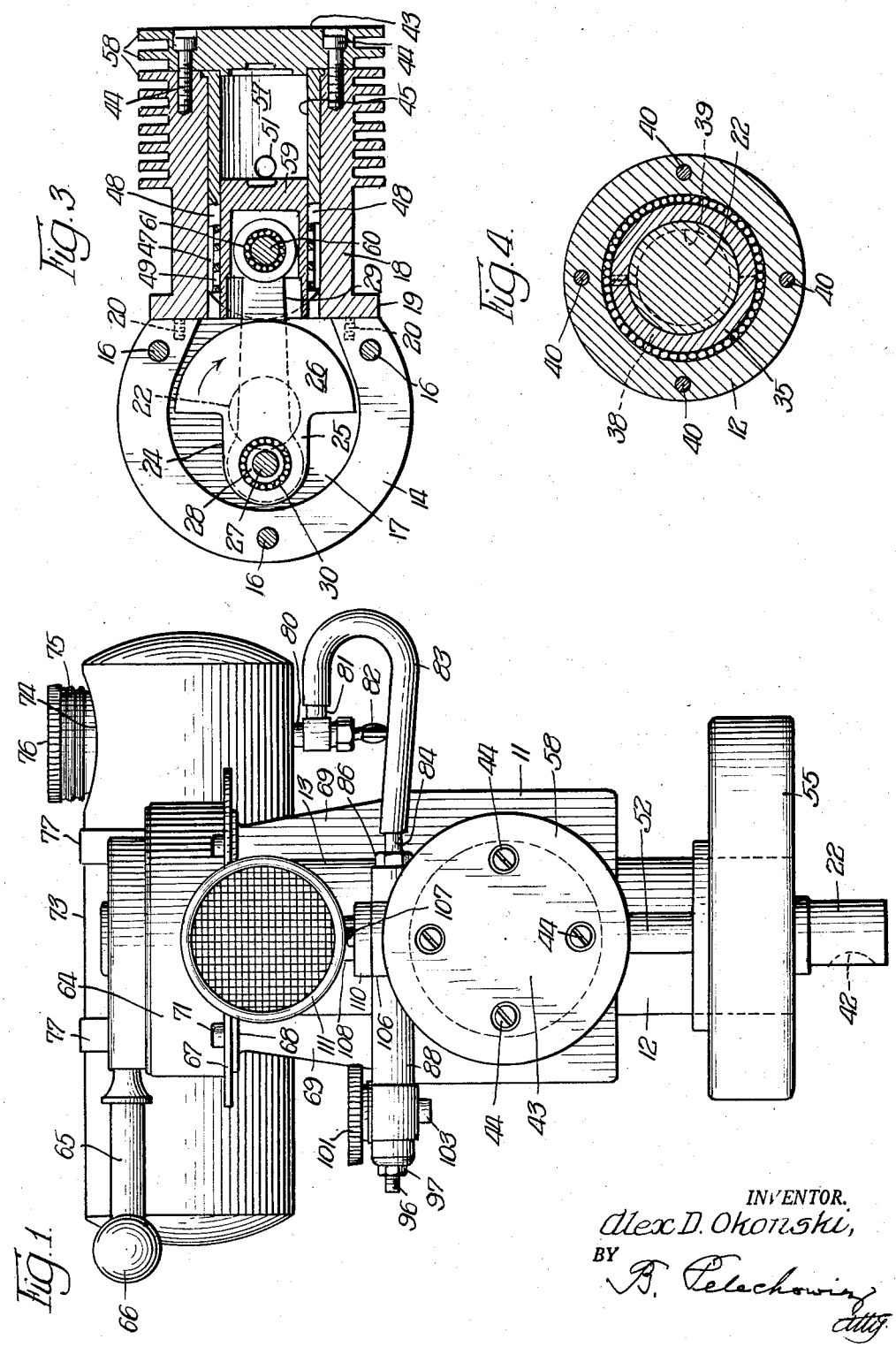

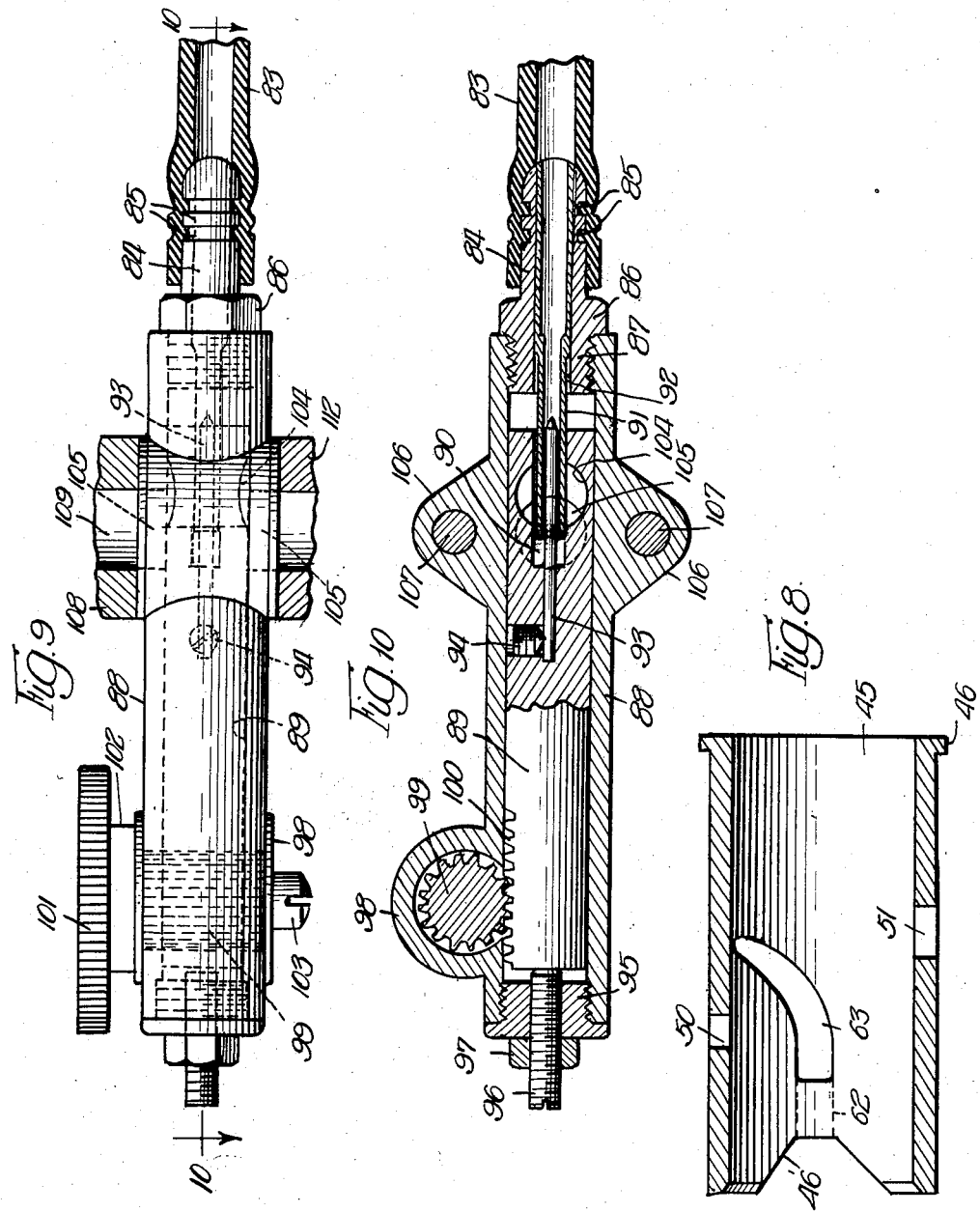

United States Patent Office 2,845,052
Patented July 29, 1958

2,845,052

INTERNAL COMBUSTION ENGINE

Alex D. Okonski, Chicago, Ill.

Application December 5, 1956, Serial No. 626,347

5 Claims. (Cl. 123—73)

The present invention relates to internal combustion engines and has for its main object the provision of injecting into the combustion chamber an air and fuel mixture wherein it may be exploded as a result of pressure exerted by the piston upon the air and fuel mixture on its upstroke, without the aid of electric spark or any other firing means.

Another object of the present invention is the provision in an engine of the type indicated of means whereby air and fuel mixture may be sucked into the crank case of the engine on the upstroke of the piston, with means for injecting the air and fuel mixture from the crank case into the combustion chamber at the moment when the piston has reached the maximum of its downstroke movement.

Another object of the present invention is the provision of efficient means for regulating the amount of air and combustion fuel required for the combustion mixture for the most efficient operation of the engine.

A still further object of the present invention is the provision of an internal combustion engine partaking of some of the features of a diesel engine and a gasoline engine, while eliminating the need for spark plugs and fuel injecting pumps normally required for the operation of such latter engines.

A still further object of the present invention is the provision of an internal combustion engine of the type hereinabove indicated of a most compact nature and requiring comparatively few parts and so connected as to require a minimum effort for their assembly.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views;

Fig. 1 is a side elevational view of the present engine;

Fig. 2 is a cross sectional view, partly in elevation, taken on a plane substantially 90 degrees from that of Fig. 1;

Fig. 3 is a cross sectional view on line 3—3 of Fig. 2;

Fig. 4 is a cross sectional view on line 4—4 of Fig. 2;

Fig. 5 is an enlarged longitudinal cross sectional view of a combustion cylinder liner;

Fig. 6 is a transverse cross sectional view of the cylinder liner, taken on line 6—6 of Fig. 5;

Fig. 7 is a transverse cross sectional view of the cylinder liner, taken on line 7—7 of Fig. 5;

Fig. 8 is a longitudinal cross sectional view through the cylinder liner of a modified construction;

Fig. 9 is an enlarged elevational view of the carburetor; and

Fig. 10 is a longitudinal cross sectional view through the carburetor, taken on line 10—10 of Fig. 9.

Referring in detail to the present drawings there is shown therein a crank case, generally indicated in Fig. 1 by 11, which is composed of a pair of complementary sections 12 and 13 (Fig. 2).

Said sections 12 and 13 are provided with lateral offsets 14 and 15, respectively, through which a plurality of screws 16 is passed for maintaining said sections 12 and 13 and their offsets 14 and 15, respectively, in a rigid connected relation. Said sections 12 and 13 and their respective offsets 14 and 15 at their adjacent ends are hollowed for defining a substantially round crank case cavity 17 which opens upon the straight face of said sections 12 and 13, and communicates with cylinder 18. The adjacent end of said cylinder 18 contacting said sections 12 and 13 is provided with flange 19 through which a plurality of screws 20 is driven to engage said sections 12 and 13 for the purpose of maintaining said cylinder 18 in a rigid engagement therewith.

The crank shaft includes a pair of shaft sections 21 and 22, the shaft section 22 being of a diameter greater than that of shaft section 21. By their proximate ends said shaft sections 21 and 22 enter the crank case cavity 17 and each is rigidly engaged with crank arms 23 and 24 24, respectively. Each of said crank arms 23 and 24 includes a narrower end 25 and an enlarged head 26, the latter being substantially equal in weight to the weight of the piston hereinafter described for the purpose of effecting a balance therebetween for bringing about easier operation of the crank and the piston.

Passed through the narrower end 24 of crank arm 23, in a rigid relation therewith, is wrist pin 27, the free end of which carries lining tube 28. One end of connecting rod 29 is disposed over said lining tube 28, with a roller bearing 30 interposed therebetween. The opposite end of said lining tube 28 with the opposite end of said wrist pin 27 is engaged by the narrower end 25 of the crank arm 24 as is clearly seen in Figs. 2 and 3. Said crank arms 23 and 24 are in a spaced relation with said connecting rod 29 interposed therebetween, as is seen in Fig. 2.

Said shaft section 21 is passed through lining member 31 (Fig. 2) maintained within the crank case section 13. Ball bearing 32 encompasses the inner end of said shaft section 21. Oil seal 33 is provided for preventing seepage of oil past shaft section 21 and said oil seal 33 from the crank case.

A similar ball bearing 34 is provided around the inner end of shaft section 22. A roller bearing 35 (Figs. 2 and 4) encompasses said shaft section 22 adjacent the opposite end of crank case section 12. Metallic washer 36 contacts the lower ends of said crank case section 12 and roller bearing 35, with head 37 superimposed upon said washer 36. Split washer 38 enters a circumferential groove 39 made in said shaft section 22. Said split washer 38 is embedded within said head 37. A plurality of screws 40 is passed through said head 37 and said washer 36 and engages the end of said crank case section 12 for maintaining said head 37 and said roller bearing 35 in an operative position therewith. Spring type oil seal 41 is carried by said head 37 in an encompassing relation with said shaft section 22 for preventing seepage of oil past said shaft section 22 from the crank case. The lowermost end of shaft section 22 is provided with a longitudinal slot 42 whereat various machines may be engaged for taking on the motive power from the present engine.

The opposite end of cylinder 18 is engaged and closed by head 43, with a plurality of screws 44 passed therethrough for engaging said end of cylinder 18.

Positioned within said cylinder 18 is cylinder liner or sleeve 45, which is best shown in Fig. 5. The outer end of said cylinder liner 45 is provided with an external flange 46, entering a corresponding groove within cylinder 18 and is there clamped by the body portion of cylinder 18 and said head 43 for maintaining said cylinder liner in a rigid position within cylinder 18.

The opposite end of said cylinder liner 45 remains flush with the adjacent end of said cylinder 18 and contacts the straight walls of said crank case sections 12 and 13.

At the inner end of said cylinder liner 45, on two diametrically opposed points thereof, there is a pair of substantially V-shaped recesses 46', the apex of each being in communication with a groove 47 made in the outer periphery of said cylinder liner 45 substantially in a longitudinal relation therewith. Said grooves 47 by their opposite ends terminate short of the longitudinal center of the cylinder liner 45 and communicate with oblong openings 48 made in the said cylinder liner 45 in an oblique relation with the axis thereof. These openings 48 will be hereinafter referred to as fuel openings. The body portion of the cylinder liner 45 oppositely of grooves 47 is provided with a plurality of apertures 49 for the purpose hereinafter described. Openings 48 in conjunction with the adjacent body portions of said cylinder liner 45 and the inner periphery of cylinder 18 define fuel passages for permitting fuel mixture to pass from the crank case cavity 17 into said fuel openings 48 and from there into the combustion chamber, as will be hereinafter described.

Both cylinder 18 and cylinder liner 45 are provided with alined transverse openings 50, which will hereinafter be referred to as fuel intake port 50. The opening 50 made in said cylinder liner 45 is made at a point median of the two grooves 47 and on a plane only slightly removed from the plane of the ends of said openings 48 with which said grooves 47 communicate.

Cylinder 18 and cylinder liner 45 are provided with communicating openings 51 at a point of the peripheries thereof which are opposite from the point at which said fuel intake port 50 is made. Said openings 51 in said cylinder 18 and cylinder liner 45 will be hereinafter referred to as the exhaust port or vent 51. Said exhaust vent 51 is at a point which partakes of the plane of the opposite ends of said fuel openings 48, and is made at a point median of said openings 48.

Exhaust vent 51 communicates with tube 52, which is downwardly depending from said cylinder 18 and to which the same is rigidly connected by means of flange 53 and a plurality of screws 54 passed through said flange 53 for engaging cylinder 18. The opposite end of said tube 52 is connected with muffler 55 which is provided with a plurality of exhaust ports 56 for passing the exhaust gases from the combustion chamber 57.

Said head 43 and said cylinder 18 adjacent its outer end and opposite to said combustion chamber 57 are each provided with a plurality of radial fins 58 for dissipating heat generated in said combustion chamber 57.

Positioned within cylinder liner 45 for reciprocating movement is piston 59. Positioned within said piston 59 in a transverse relation is wristpin 60 upon which the opposite end of said connecting rod 29 is journalled. Roller bearing 61 is interposed between said wristpin 60 and the adjacent body portion of said connecting rod 29 for facilitating turning of said connecting rod 29 upon said wristpin 60.

The modified form of cylinder liner 45, illustrated in Fig. 8, in all respects conforms to the construction of the cylinder liner illustrated in Fig. 5 except that the former is provided with a comparatively short groove 62 in communication by its one end with recess 46, while the opposite end thereof communicates with a substantially crescent-shaped opening 63. There are of course two of said grooves 62 and openings 63, on diametrically opposite points of the periphery of said cylinder liner 45, and intermediately of intake port 50 and exhaust vent 51. The outer free end of said openings 63 overlap the transverse plane through said exhaust vent 51. In conjunction with the inner periphery of cylinder 18 said grooves 62 define passages for fuel mixture from the crank case cavity 17 into openings 63 and therefrom into combustion chamber as will be hereinafter described.

The outer end of the crank shaft section 21 is passed into casing 64 and there connects with a conventional recoil starter actuable by means of rod 65 and a transverse handle 66 rigidly affixed to said rod 65 in a transverse relation, by means of which handle 66 said rod 65 may be pulled to set the recoil starter in operation for imparting initial rotary movement to the crank shaft.

Adjacent its lower end said casing 64 is provided with flange 67 which rests upon laterally projecting lugs 68 integrally formed with the upper ends of posts 69. The lower ends of said posts 69 are flanged, and screws 70 driven therethrough engage offset 15 for the purpose of rigidly engaging said posts 69 with the crank case. As seen in Figs. 1 and 2 there are four of the said posts 69.

Screws 71 passed through flange 67 and lugs 68 maintain the starter casing 64 in a rigid connection with said posts 69.

Lugs 68, which extend from a pair of posts 69 farther removed from cylinder 18, are prolonged and have formed therein arcuate downwardly extending bends 72, the two of which form a cradle for supporting cylindrical tank 73 receiving therewithin liquid fuel through an upwardly extending cylindrical mouth 74, the outer periphery of which is threaded for receiving in a threaded relation tubular member 75 which at one of its ends supports closure 76.

A pair of C-shaped clamps 77 superimposed over the upper peripheral portion of said tank 73, with their laterally extending ends 78 engaged by screws 79 and rigidly connected with a pair of said lugs 68, maintain said tank 73 rigidly upon said cradle defined by said bends 72.

Connected to the bottom of tank 73, adjacent one of its ends, is fuel outlet pipe 80, to which a horizontal branch pipe 81 is connected. A valve is set within said pipe 80, operable by means of petcock handle 82, extending outwardly of said pipe 80, permits the flow of fuel into said pipe 81, or shuts off the fuel therefrom, on turning said handle 81 to one or the opposite direction.

Flexible tube 83, preferably made of plastic, connects by one of its ends with said branch pipe 81, and the other end thereof is connected with nozzle 84 (Figs. 1, 9 and 10). Said nozzle 84 is knurled or grooved as at 85 for assuring positive engagement of said tube 83 with nozzle 84. Said nozzle 84 is integrally formed with nut 86 from which a reduced outwardly threaded plug 87 depends. Said plug 87 enters one end of carburetor cylindrical casing 88 and is there threadedly engaged therewith.

Positioned within said casing 88 for a longitudinal sliding movement is rod 89. Said rod 89 adjacent its end which is proximate to said plug 87 is provided with a concentric bore 90, into which one end of valve tube 91 enters. The opposite end of said valve tube 91 is positioned within a bore 92 made in said nozzle 84, nut 86 and plug 87, and is held therewithin due to frictional engagement therewith or any other suitable means. The diameter of the inner end of said valve tube 91 is slightly smaller than the diameter of said bore 90 providing a sufficient tolerance therebetween in order to permit passage of liquid fuel which enters said valve tube 91 from tube 83. Embedded by one of its ends within said rod 89 in a concentric relation therewith is pin 93, the opposite free end of which traverses said bore 90 and is positioned in a concentric relation therewith. Said free end of said pin 93 enters the adjacent end of said valve tube 91 and slides therewithin when said rod 89 is shifted to one or opposite direction. To further assure rigid connection of said pin 93 with rod 89 screw member 94 is transversely passed through said rod 89 for the purpose of rigidly engaging said pin 93. The free end of said pin 93 is in a spaced relation with the inner periphery of adjacent end of valve tube 91 permitting liquid fuel to pass therebetween into the inner end of bore 90.

The opposite end of said casing 88 is closed by means of plug 95 threadedly engaged with the inner periphery of said casing 88. Passed through said plug 95 is an adjusting screw 96, the inner end of which bears against the adjacent end of said rod 89 and limits farther sliding movement of said rod 89 in the direction of said plug 95. Lock nut 97 engages said screw 96 and maintains the same in an adjusted position with relation to said rod 89.

Laterally extending from said casing 88 adjacent the end thereof which is proximate to said plug 95 is gear housing 98 receiving therewithin gear 99, several teeth of which extending into casing 88 and there engage the teeth of rack 100 made upon the adjacent end of said rod 89. Gear 99 is in any suitable manner rigidly connected with knob 101, which extends above said housing 98. One mode of rigidly connecting knob 101 with gear 99 is suggested in Fig. 9, wherein there is shown a reduced stud 102, with which screw 103, axially passed through gear 99 and rigidly connected therewith, engages said stud 102. Thus when knob 101 is turned in either direction, gear 99, connected with rack 100, shifts rod 89 in one or the opposite direction.

When said rod 89 is shifted to the fullest extent toward plug 87 the inner end of valve tube 91 will come in contact with the body portion of rod 89 which defines the bottom for bore 90, and will thereby block the passage of liquid fuel from said tube 91 into bore 90. As is obvious the amount of the liquid fuel passing from valve tube 91 into bore 90 at any given time may be regulated by shifting rod 89 to one or the opposite direction by means of knob 101 and gear 99.

Adjacent the end of said rod 89 which is proximate to plug 87 transverse bore 104 is made therein. A similar bore 105 is made in casing 88. Said bores 104 and 105 are partially in an overlapping relation as is seen in Fig. 10. When said rod 89 is shifted toward plug 87 the overlapping area of the two bores is diminished, thereby decreasing the passage of air. Liquid fuel flows from valve tube 91 into bore 90, and therefrom past the outer periphery of said valve tube 91, into bore 104 to be sucked in by the air passing from one end of said bore 105, then to and through bore 104 and then into the opposite end of said bore 105. Air striking the liquid fuel in bore 104 will disperse and atomize the liquid fuel and will form a mixture therewith.

On a plane substantially coincidental with the diameter of bore 105 casing 88 is provided with a pair of laterally extending hub wings 106, through which screws 107 are passed for engaging cylinder 18, with which said casing 88 is rigidly connected and upon which the same is supported in a transverse relation.

Air tube 108 overlies by its lower end casing 88 and defines air inlet 109 into the upper end of bore 105 (Fig. 9). Laterally extending from the lower end of said air tube 108 there is flange 110 overlying one of said hub wings 106. One of said screws 107 passes through said flange 110 and rigidly connects the same and said air tube 108 with one of said hub wings 106. By virtue of this construction air filtering casing 111, with which the upper end of air tube 108 connects, is also rigidly supported upon said casing 88. By virtue of the arrangement described, air is passed through filters within the filtering casing 111, and from there is sucked through tube 108 into said bore 105.

Connecting with casing 88 and in communication with the lower, outlet end of bore 105 is tubular fixture 112 which is interposed between said casing 88 and cylinder 18 (Fig. 2) and is in communication with intake port 50 in said cylinder 18 and cylinder lining 45.

For fuel, gasoline, kerosene or oil may be used. If gasoline is used oil should be added thereto in order to provide for self-lubrication of moving parts of the engine.

From the hereinabove description it will be seen that liquid fuel injected into bore 104 as it passes from valve tube 91 is there acted upon by air as it passes from air inlet 109, and forms a fuel mixture which is substantially in a gaseous condition. This mixture is sucked from the lower end of bore 105 through said connecting fixture 112, into intake port 50 and to the crank case, on the upstroke of piston 59, due to a vacuum created in the crank case on the upstroke of said piston. At the upstroke position of the piston the end thereof which is proximate to the crank case has cleared the intake port 50 permitting the fuel mixture to enter the inner end of cylinder lining 45 and completely fill the crank case including its cavity 17.

As the piston head of piston 59 advances toward head 43 and reaches the utmost of its upstroke the fuel mixture in the combustion chamber 57 is compressed to the utmost and explosion of the fuel mixture takes place due to the compression thereof. The explosion of the fuel mixture in the combustion chamber 57 causes piston 59 to shift to the opposite direction, that is to the downstroke position, thereby opening the exhaust vent 51, through which combustion gases generated in the combustion chamber are exhausted to tube 52 and muffler 55.

When piston 59 has reached its maximum of its downstroke movement, the piston head clears exhaust vent 51, with piston 59 closing intake port 50 compressing the fuel mixture in the crank case. As the piston approaches the maximum of its downstroke, it opens the ends of openings 48 upon combustion chamber 57 (Fig. 2), permitting the fuel mixture to gush from the crank case, along grooves 47 and into the oblong openings 48, and from the cleared or exposed ends of the latter into the combustion chamber 57. Since the cleared or exposed ends of openings 48 are located at points farthest removed from exhaust vent 51, as is seen in Fig. 2, the gushing fuel mixture through said exposed ends of openings 48 not only fills the combustion chamber 57, but also forces complete exhaustion of the remaining combustion gases through said exhaust vent 51.

Since at the upstroke position of the piston openings 48 are not in communication with the combustion chamber 57, they being blocked by the piston, with the intake port 50 unobstructed by the piston, it follows that at the upstroke position of the piston the fuel mixture will be sucked into the cylinder lining 45 adjacent its end which is proximate to the crank case and will fill the said end of the cylinder lining 45 as well as the crank case. The sucking in of the fuel mixture through said intake port 50 into the end of the cylinder lining 45 which is proximate to the crank case and from there into the crank case is of course brought about by the vacuum created in the said end of the cylinder lining 45 and in the crank case due to the shifting of the piston from its downstroke to its upstroke positions.

Due to the explosion of the fuel mixture occurring in the combustion chamber 57 by virtue of the compression of the fuel mixture by piston 59 at its upstroke position, the piston is caused to shift to its downstroke position, thereby precompressing the fuel mixture in the crank case, closing the intake port 50 so as to prevent the backing of the fuel mixture to the carburetor. As piston 59 comes to its downstroke position, causing the opening of the exhaust vent 51 and opening the ends of openings 48 upon combustion chamber 57, thereby exhausting combustion gases from combustion chamber 57 through said exhaust vent 51, and filling said combustion chamber with the fuel mixture, as was already mentioned. Since at the downstroke position of piston 59 the fuel mixture in the crank case is compressed, the fuel mixture will gush through said openings 48 to fill combustion chamber 57 and to complete the exhaustion gases through the exhaust vents 51 as was already mentioned, The engine is self-lubricating. If gasoline is used as a fuel oil should be mixed therewith to provide a lubricant for the moving parts.

Although apertures 49 provide lubrication access between the inner periphery of cylinder lining 45 and piston 59, their chief function however is to provide frictional drag upon the fuel mixture as it gushes from the crank case through grooves 47 into said openings 48 and therefrom into the combustion chamber 57 on the downstroke position of the piston, thereby assuring final complete mixture of air and the fuel before the fuel mixture reaches the combustion chamber 57.

In the modified form of the cylinder lining 45 illustrated in Fig. 8 the body portions of the cylinder lining 45 opposite grooves 62 are devoid of apertures comparable to apertures 49 in the preferred form of the cylinder lining 45 illustrated in Fig. 3.

From a broader aspect of the invention cylinder lining 45 is not an essential feature of the invention. Obviously, the same may be eliminated in which case grooves 47 and 62, as the case may be, with fuel passages 48 and 63, as the case may be, the latter equivalent of said openings 48 and 63, respectively, may be made directly in the body of cylinder 18, adjacent its inner periphery. Thus the said cylinder lining 45 may be considered as equivalent of the inner peripheral portion of cylinder 18 itself. In practice however if grooves 47 or 62 and openings 48 or 63 were to be made directly in the body of cylinder 18 their machining would involve some difficulties. These difficulties may be eliminated by machining the cylinder lining 45 and then inserting the same within cylinder 18 as is shown in Fig. 3.

While there are described herein preferred embodiments of the present invention, it is nevertheless to be understood that minor changes may be made therein without departing from the spirit and scope of the invention as claimed.

What I claim as new is:

1. In an internal combustion engine, a cylinder, a closed crank case communicating with the interior of the cylinder, a sleeve lining the inner wall of the cylinder, a piston reciprocable in said sleeve and slidably fitting the same, the end of said sleeve above the piston defining a combustion chamber, said sleeve provided with a fuel inlet port and an exhaust port offset from one another axially of the sleeve, said piston adapted in its reciprocating movement to uncover one or the other of said ports, the stroke length of the piston being so related to the ports so as to cut off both ports during the greater portion of the piston's stroke but that at the upper end of its stroke fuel is admitted through said inlet port to the underside of the piston and that at the lower end of its stroke burned gases will escape from the exhaust port, said sleeve further provided with an elongated groove in the outer face of the sleeve entending longitudinally thereof and communicating at its lower end with the crank case and having a port at its upper end communicating with the chamber, whereby fuel compressed within the crank case may be by-passed around the sleeve and piston when the piston is at the lower end of its stroke and introduced into the chamber.

2. In an internal combustion engine, a cylinder, a closed crank case communicating with the interior of the cylnder, a sleeve lining the inner wall of the cylinder, a piston reciprocable in said sleeve and slidably fitting the same, the end of said sleeve above the piston defining a combustion chamber, said sleeve provided with a fuel inlet port and an exhaust port offset from one another axially of the sleeve, said piston adapted in its reciprocating movement to uncover one or the other of said ports, the stroke length of the piston being so related to the ports so as to cut off both ports during the greater portion of the piston's stroke but that at the upper end of its stroke fuel is admitted through said inlet port to the underside of the piston and that at the lower end of its stroke burned gases will escape from the exhaust port, said sleeve further provided with an elongated groove in the outer face of the sleeve extending longitudinally thereof and communicating at its lower end with the crank case and having a port at its upper end communicating with the chamber, whereby fuel compressed within the crank case may be by-passed around the sleeve and piston when the piston is at the lower end of its stroke and introduced into the chamber, the port in the sleeve being in the form of an elongated slot open at one end to the groove and extending obliquely therefrom in the sleeve.

3. In an internal combustion engine, a cylinder, a closed crank case communicating with the interior of the cylinder, a sleeve lining the inner wall of the cylinder, a piston reciprocable in said sleeve and slidably fitting the same, the end of said sleeve above the piston defining a combustion chamber, said sleeve provided with a fuel inlet port and an exhaust port offset from one another axially of the sleeve, said piston adapted in its reciprocating movement to uncover one or the other of said ports, the stroke length of the piston being so related to the ports so as to cut off both ports during the greater portion of the piston's stroke but that at the upper end of its stroke fuel is admitted through said inlet port to the underside of the piston and that at the lower end of its stroke burned gases will escape from the exhaust port, said sleeve further provided with an elongated groove in the outer face of the sleeve extending longitudinally thereof and communicating at its lower end with the crank case and having a port at its upper end communicating with the chamber, whereby fuel compressed within the crank case may be by-passed around the sleeved and piston when the piston is at the lower end of its stroke and introduced into the chamber, said groove having a substantially closed inner wall forming a bearing surface for the piston.

4. In an internal combustion engine, a cylinder, a closed crank case communicating with the interior of the cylinder, a sleeve lining the inner wall of the cylinder, a piston reciprocable in said sleeve and slidably fitting the same, the end of said sleeve above the piston defining a combustion chamber, said sleeve provided with a fuel inlet port and exhaust port offset from one another axially of the sleeve, said piston adapted in its reciprocating movement to uncover one or the other of said ports, the stroke length of the piston being so related to the ports so as to cut off both ports during the greater portion of the piston's stroke but that at the upper end of its stroke fuel is admitted through said inlet port to the underside of the piston and that at the lower end of its stroke burned gases will escape from the exhaust port, said sleeve further provided with an elongated groove in the outer face of the sleeve extending longitudinally thereof and communicating at its lower end with the crank case and having a port at its upper end communicating with the chamber, whereby fuel compressed within the crank case may be by-passed around the sleeve and piston when the piston is at the lower end of its stroke and introduced into the chamber, said groove having a substantially closed inner wall forming a bearing surface for the piston with apertures in the bottom of the groove spaced along the length thereof to produce turbulence in the fuel mixture flowing through the groove.

5. An internal combustion engine comprising a cylinder, a removable head on the outer end of the cylinder, a closed crank case communicating with the opposite end of the cylinder, a sleeve lining the inner wall of the cylinder, a flange on the outer end of the sleeve clamped between the head and the outer end of the cylinder, a piston reciprocable in said sleeve and slidably fitting the same, the end of said sleeve above the piston defining a combustion chamber, said sleeve provided with a fuel inlet port and an exhaust port offset from one another axially of the sleeve, said piston adapted in its reciprocating movement to uncover one or the other of said ports, the stroke length of the piston being so related to the ports so as to cut off both ports during the greater portion of the piston's stroke but that at the upper end of its stroke fuel is admitted through said inlet port to the underside of the piston and that at the lower end of its stroke burned gases will escape from the exhaust port, said sleeve further provided with an elongated groove extending longitudinally thereof and communicating at its lower end with the crank case and having a port at its upper end communicating with the chamber, whereby fuel compressed within the crank case may be by-passed around the sleeve and piston when the piston is at the lower end of its stroke and introduced into the chamber.

References Cited in the file of this patent

UNITED STATES PATENTS

| | | |
|---|---|---|
| 1,172,472 | McCornack | Feb. 22, 1916 |
| 1,374,573 | Imhoff | Apr. 12, 1921 |
| 1,728,472 | Brekke | Sept. 17, 1929 |
| 2,583,499 | Teegen | Jan. 22, 1952 |
| 2,586,467 | Jacobsen | Feb. 19, 1952 |